United States Patent
Hirai et al.

(10) Patent No.: US 6,664,313 B2
(45) Date of Patent: Dec. 16, 2003

(54) POLYCARBONATE RESIN COMPOSITION AND ITS MOLDED ARTICLES

(75) Inventors: Yasuhiro Hirai, Hiratsuka (JP); Kazuhiko Ishii, Hiratsuka (JP)

(73) Assignee: Mitsubishi Engineering-Plastics Corporation, Tokyo (JP)

( * ) Notice: Subject to any disclaimer, the term of this patent is extended or adjusted under 35 U.S.C. 154(b) by 0 days.

(21) Appl. No.: 10/023,016

(22) Filed: Dec. 18, 2001

(65) Prior Publication Data

US 2002/0146550 A1 Oct. 10, 2002

(30) Foreign Application Priority Data

Dec. 21, 2000 (JP) .......................................... 2000-388392
Sep. 27, 2001 (JP) .......................................... 2001-295679

(51) Int. Cl.$^7$ ............................ C08L 69/00; C08K 3/36; C08K 9/06
(52) U.S. Cl. ...................... 523/209; 523/212; 524/165; 524/264; 524/267; 524/268; 524/269; 524/492; 524/493; 524/497
(58) Field of Search ............................ 523/209, 212; 524/165, 264, 267, 268, 269, 492, 493, 497

(56) References Cited

U.S. PATENT DOCUMENTS

| | | | |
|---|---|---|---|
| 5,198,330 A | * | 3/1993 | Martic |
| 5,837,757 A | | 11/1998 | Nodera et al. |
| 6,133,360 A | | 10/2000 | Barren et al. |
| 6,369,141 B1 | * | 4/2002 | Ishii |

FOREIGN PATENT DOCUMENTS

| | | | |
|---|---|---|---|
| EP | 0 752 448 A2 | | 1/1997 |
| JP | 09-279001 | * | 10/1997 |
| JP | 11-181267 | * | 7/1999 |
| JP | 2000-169686 | * | 6/2000 |

OTHER PUBLICATIONS

European Search Report.

* cited by examiner

*Primary Examiner*—David J. Buttner
(74) *Attorney, Agent, or Firm*—Edwards & Angell, LLP; David G. Conlin; Lisa Swiszcz Hazzard

(57) ABSTRACT

The present invention relates to a polycarbonate resin composition comprising 100 parts by weight of an aromatic polycarbonate resin (a), 3 to 30 parts by weight of titanium oxide (b), 0.01 to 9 parts by weight of silica (c1), 0.01 to 9 parts by weight of a polyorganosiloxane polymer (c2), and 0.01 to 5 parts by weight of polytetrafluoroethylene (d).

14 Claims, No Drawings

POLYCARBONATE RESIN COMPOSITION AND ITS MOLDED ARTICLES

BACKGROUND OF THE INVENTION

The present invention relates to a polycarbonate resin composition and its molded articles. More particularly, it relates to a polycarbonate resin composition which is preferably used to reflectors and has improved flame retardancy without containing any halogenic or phosphate-based flame retardant which is causative of a corrosive action, burning of resin and lowering of heat resistance, and the articles molded from such a resin composition.

Polycarbonate resins are widely used in many fields of industry such as, typically, automobiles, OA equipment, and electric and electronic devices because of their excellent mechanical properties. The display-related devices required to have a high level of light reflectance, such as reflectors for backlight of liquid crystal displays, luminous push switches, photoelectic switches, etc., in various types of display devices for computers and television-related devices such as thin film transistors (TFT), have now become generalized, and the molded articles produced from the compositions comprising polycarbonate resins incorporated with a white pigment such as titanium oxide are being used for the light reflectors used in such devices.

Japanese Patent Application Laid-Open (KOKAI) No. 9-12853 proposes a polycarbonate resin composition with high light reflectance comprising (A) a polycarbonate resin, (B) titanium oxide, (C) a composite rubber-based graft polymer produced by graft polymerizing one or more vinyl monomers with a composite rubber having a structure in which a polyorganosiloxane rubber and an alkyl poly(meth) acrylate are inseparably entangled with each other, (D) a flame retardant and (E) polytetrafluoroethylene. This resin composition, however, involves the problems such as corrosive action to the cylinder, screw and mold of the molding machine, burning of the resin and deterioration of heat resistance as the composition contains a halogenic and/or a phosphate type flame retardant.

Also, a composition comprising a polyorganosiloxane polymer and polytetrafluoroethylene (Japanese Patent Application Laid-Open (KOKAI) No. 5-202280) and a composition comprising a polyorganosiloxane polymer and silica (Japanese Patent Application Laid-Open (KOKAI) No. 8-22371) have been proposed as the polycarbonate resin compositions improved in flame retardancy without containing a flame retardant such as mentioned above, but these resin compositions are not necessarily satisfactory in flame retardancy.

As a result of the present inventors' earnest study to solve the above problem, it has been found that by polycarbonate resin composition comprising aromatic polycarbonate resin, titanium oxide, silica, polyorganosiloxane polymer and polytetrafluoroethylene in a specific amount, the above problem can be solved.

The present invention has been attained on the basis of the above finding.

SUMMARY OF THE INVENTION

The first object of the present invention is to provide a polycarbonate resin composition with excellent heat stability, a high light reflectance, high reflecting properties, and excellent flame retardancy.

The second object of the present invention is to provide a polycarbonate resin composition with improved flame retardancy which is freed of such problems as corrosive action to the molding machine, mold, etc., burning of the resin and deterioration of heat resistance.

The third object of the present invention is to provide the molded articles having beautiful visual appearance, high light reflecting properties and excellent flame retardancy.

To attain the above aim, in the first aspect of the present invention, there is provided a polycarbonate resin composition comprising 100 parts by weight of an aromatic polycarbonate resin (a), 3 to 30 parts by weight of titanium oxide (b), 0.01 to 9 parts by weight of silica (c1), 0.01 to 9 parts by weight of a polyorganosiloxane polymer (c2), and 0.01 to 5 parts by weight of polytetrafluoroethylene (d).

In the second aspect of the present invention, there are provided the molded articles comprising the polycarbonate resin composition as defined in the first aspect.

DETAILED DESCRIPTION OF THE INVENTION

The invention is described in detail below.

The aromatic polycarbonate resin (a) used in the present invention is a thermoplastic aromatic polycarbonate polymer or copolymer which may be branched and can be produced by reacting an aromatic hydroxyl compound and/ or a small quantity of a polyhydroxyl compound with phosgene or a carbonic acid diester. The method of producing this resin (a) is not specifically restricted; it may be produced by any usual method such as phosgene method (interfacial polymerization method) or melting method (ester exchange method). It is also possible to use an aromatic polycarbonate resin with a regulated amount of terminal OH groups, produced by the melting method.

The aromatic dihydroxyl compounds usable in the present invention include, for example, 2,2-bis(4-hydroxyphenyl) propane (=bisphenol A), tetramethylbisphenol A, α,α'-bis (4-hydroxyphenyl)-1,4-diisopropylbenzene, hydroquinone, resorcinol and 4,4-dihydroxydiphenyl. Among them, bisphenol A is preferred. Use of an aromatic dihydroxyl compound having one or more tetraalkylphosphonium sulfonate bonded thereto is preferable as it provides further improvement of flame retardancy of the produced polycarbonate resin composition.

The branched aromatic polycarbonate resins can be obtained by using the following compounds as a partial substitution for the said aromatic dihydroxyl compounds. Examples of such substitute compounds include polyhydroxyl compounds such as fluoroglucin, 4,6-dimethyl-2,4, 6-tri(4-hydroxyphenyl)-2-heptene, 4,6-dimethyl-2,4,6-tri(4-hydroxyphenyl)heptane, 2,6-dimethyl-2,4,6-tri(4-hydroxypheyl)-3-heptene and 1,3,5-tri(4-hydroxyphenyl) benzene; 1,1,1-tri(4-hydroxyphenyl)ethane, 3,3-bis(4-hydroxydiaryl)oxyindole (=isatinbisphenol), 5-chloroisatin, 5,7-dichloroisatin, and 5-bromoisatin. These compounds are usually used in an amount of 0.01 to 10 mol %, preferably 0.1 to 2 mol %.

The particularly preferred aromatic polycarbonate resins for use in the present invention are the aromatic polycarbonate resins derived from 2,2-bis(4-hydroxyphenyl) propane and the polycarbonate polymers derived from 2,2-bis(4-hydroxyphenyl)propane and other aromatic dihydroxyl compounds. In the course of preparation of the aromatic polycarbonate resin, a polymer or an oligomer having a siloxane structure may be copolymerized for further improving flame retardancy of the produced polycarbonate resin composition. The aromatic polycarbonate resin used in the present invention may be a mixture of two or more types of aromatic polycarbonate resin differing in composition, molecular weight, etc.

A monovalent aromatic hydroxyl compound is preferably used for adjusting the molecular weight of the aromatic polycarbonate resin (a). Examples of such monovalent aromatic hydroxyl compounds are m- and p-methylphenol, m- and p-propylphenol, p-tert-butylphenol, and long-chain alkyl-substituted p-phenol. The molecular weight of the aromatic polycarbonate resin (a), when expressed in terms of viscosity-average molecular weight calculated from solution viscosity determined at 25° C. using methylene chloride as solvent, is usually in the range of 16,000 to 30,000, preferably 17,000 to 26,000, more preferably 18,000 to 23,000.

Titanium oxide (b) used in the present invention functions to improve light screening properties, whiteness, light reflecting properties, etc., of the molded articles of the polycarbonate resin composition. Titanium oxide (b) is not subject to any specific restrictions regarding its production method, crystal structure and average particle size. There are two types of production method of titanium oxide (b): (1) sulfuric acid method and (2) chlorine method. When titanium oxide produced by the sulfuric acid method is used, the produced composition tends to deteriorate in whiteness, so that titanium oxide produced by the chlorine method is preferably used for the effective attainment of the object of the present invention.

The crystal structure of titanium oxide may be either rutile type or anatase type, but rutile type is preferred in view of light resistance. The average particle size of titanium oxide is usually 0.1 to 0.7 μm, preferably 0.1 to 0.4 μm. When the average particle size is less than 0.1 μm, the molded article proves to be unsatisfactory in light screening properties, and when the average particle size exceeds 0.7 μm, the molded article may be roughed on its surface or deteriorate in mechanical strength.

Titanium oxide (b) is preferably pretreated with an alumina hydrate and/or a silica hydrate before subjected to surface treatment with a siloxane type surface treating agent (b1) described later. Pretreatment is not essential and also not specified in its method. Pretreatment with an alumina hydrate or a silica hydrate is preferably carried out by using the hydrate in an amount of 1 to 15% by weight based on titanium oxide (b).

After the above pretreatment, titanium oxide (b) is further subjected to surface treatment with a siloxane type surface treating agent (b1). This surface treatment is preferable in the production of the polycarbonate resin composition because it improves greatly thermal stability of the composition while bettering uniform dispersibility and stability of the dispersed state in the polycarbonate resin composition and also contributes to the improvement of flame retardancy of the resin composition and affinity for silicone powder (c) and polytetrafluoroethylene (d) described later. As the siloxane type surface treating agent (b1), polyorganohydrogenosiloxanes, for example, the compounds selected from those of the following structural formulae (I), (II) and (III), are preferably used.

(I)

wherein R is a linear or branched alkyl group having 1 to 10 carbon atoms, and a and b are each an integer of not more than 4.

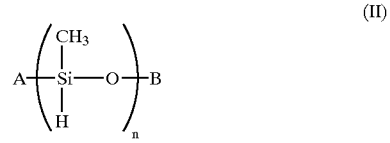

wherein A and B are the groups selected from those shown below, and n is an integer of 1 to 500.

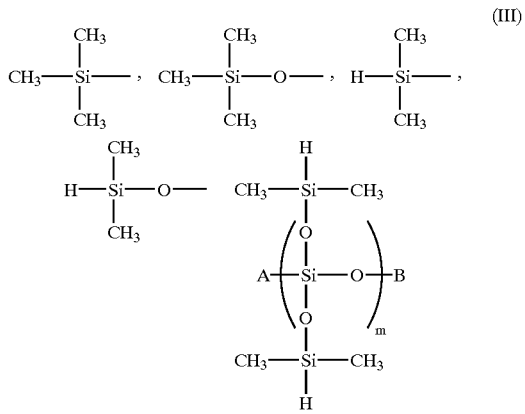

wherein A and B represent the same as defined in Formula (II) above, and m is an integer of 1 to 50.

There are two types of method, (1) wet process and (2) dry process, for the surface treatment of titanium oxide (b) with a siloxane type surface treating agent (b1). In the wet process, titanium oxide (b1) pretreated with an alumina hydrate and/or a silica hydrate is added to a mixture of a polyorganohydrogenosiloxane and a solvent, and the mixture is stirred, dissolved and further subjected to a heat treatment at 100 to 300° C. The dry process includes a method in which titanium oxide pretreated in the same way as described above and a polyorganohydrogenosiloxane are mixed by a suitable mixing means such as Henschel mixer, and a method in which an organic solution of a polyorganohydrogenosiloxane is sprayed and deposited on the pretreated titanium oxide, and then it is subjected to heat treatment at 100 to 300° C. The amount of the siloxane type surface treating agent (b1) to be applied is not specifically defined, but it is usually in the range of 1 to 10% by weight based on titanium oxide in view of reflecting properties of titanium oxide, moldability of the produced resin composition and other factors.

The content of titanium oxide (b) in the composition is in the range of 3 to 30 parts by weight based on 100 parts by weight of the aromatic polycarbonate resin (a). When the titanium oxide content is less than 3 parts by weight, the molded article of the resin composition may be unsatisfactory in light reflecting properties, and when the titanium oxide content exceeds 30 parts by weight, the resin composition lacks in impact resistance. The preferred content of titanium oxide is 5 to 25 parts by weight, more preferably 8 to 20 parts by weight, based on 100 parts by weight of the aromatic polycarbonate resin. The "weight of titanium oxide (b)" referred to herein includes the treating agents in case where titanium oxide is pretreated with an alumina hydrate and/or a silica hydrate and further surface treated with a surface treating agent such as mentioned above.

Silica (c1) used in the present invention serves to afford outstanding flame retardancy to the polycarbonate resin composition in synergism with polytetrafluoroethylene (d)

mentioned later. As silica (c1), there can be used fumed silica, precipitated silica or dug silica in a pulverized form (silica powder). Fumed silica and precipitated silica are preferably those having a surface area falling in the range of 50 to 400 m$^2$/g. These types of silica (c1) are easy to carry a polyorganosiloxane polymer on the surface (by means of absorption, adsorption or holding) according to a preferred embodiment of the invention. In case of using dug silica, it is preferably combined with at least an equal weight of fumed or precipitated silica and the mixture is adjusted so that the surface area of the mixed silica will fall within the range of 50 to 400 m$^2$/g.

Silica (c1) may be treated with a surface treating agent. As the surface treating agent, the low-molecular weight hydroxyl- or alkoxyl-terminated polyorganosiloxanes, hexaorganodisiloxanes, hexaorganodisilazanes and the like other than the polydimethylsilane polymers (c2) described later can be used. Among these polymers, the hydroxyl-terminated polydimethylsiloxanes, which are the oligomers with an average degree of polymerization of 2 to 100 and assume a liquid or viscous oily state at normal temperature, are particularly preferred.

The content of Silica (c1) is 0.01 to 9 parts by weight based on 100 parts by weight of the aromatic polycarbonate resin (a). When the content of silica (c1) is less than 0.01 part by weight, the molded article of the produced resin composition may be unsatisfactory in flame retardancy, mechanical strength and heat resistance, and when the content of silica (c1) exceeds 9 parts by weight, the obtained resin composition proves defective in impart resistance and fluidity. The preferred content of silica (c1) is 0.05 to 7 parts by weight, more preferably 0.1 to 5 parts by weight, based on 100 parts by weight of the aromatic polycarbonate resin. The indicated weight of silica (c1) includes the weight of the treating agent in case where silica is surface treated with a treating agent such as mentioned above.

The polyorganosiloxane polymer (c2) used in the present invention, as mentioned above, synergies with silica (c1) to provide remarkable flame retardancy to the polycarbonate resin composition. The organic group possessed by the polyorganosiloxane polymer (c2) is selected from hydrocarbon or halogenated hydrocarbon groups such as $C_1$–$C_{20}$ alkyl and substituted alkyl, alkenyl groups such as vinyl and 5-hexenyl, cycloalkyl groups such as cyclohexyl, and aromatic hydrocarbon groups such as phenyl, benzyl and tolyl. $C_1$–$C_4$ lower alkyl groups, phenyl group, and halogen-substituted alkyl groups such as 3,3,3-trifluoropropyl are preferred. The polyorganosiloxane polymer (c2) may be either linear or branched, but a linear polydimethylsiloxane with no branching group is preferred.

The polyorganosiloxane polymer (c2) may be either a polyorganosiloxane polymer (c21) having no functional group in the molecular chain or a polyorganosiloxane polymer (c22) having a functional group in the molecular chain. In the case of a polyorganosiloxane polymer (c22) having a functional group, the functional group is preferably a methacrylic group or an epoxy group. The presence of a methacrylic group or an epoxy group in the molecular chain induces a crosslinking reaction with the aromatic polycarbonate (a) during burning, providing further improvement of flame retardancy of the resin composition.

The quantity of the functional group in the molecular chain of the polyorganosiloxane polymer (c2) is ordinarily about 0.01 to 1 mol %, preferably 0.03 to 0.5 Mol %, especially 0.05 to 0.3 mol %.

The content of the polyorganosiloxane polymer (c2) is in the range of 0.01 to 9 parts by weight based on 100 parts by weight of the aromatic polycarbonate resin (a). When the content of the silica (c1) is less than 0.01 part by weight, the molded article of the produced resin composition may be unsatisfactory in flame retardancy, mechanical strength and heat resistance, and when the polymer content exceeds 9 parts by weight, the obtained resin composition may lack in impact resistance and fluidity. The preferred content of the polyorganosiloxane polymer (c2) is 0.07 to 7 parts by weight, more preferably 0.1 to 5 parts by weight, based on 100 parts by weight of the aromatic polycarbonate resin.

For the preparation of the resin composition according to the present invention, a melt mixing method using a double-screw extruder or other like means is used as described later. In this method, in case where a polyorganosiloxane polymer (c2) is directly blended in an aromatic polycarbonate resin (a), there may take place improper supply of the polyorganosiloxane polymer (c2) to the double-screw extruder, hampering take-up of the strand of a fixed size or causing cut of the strand, making it difficult to prepare the desired resin composition in a stable way. In the present invention, in order to eliminate such disadvantages, the polyorganosiloxane polymer (c2) is preferably carried on titanium oxide (b) and/or silica (c1). In the present invention, "carried on" means that not only the polyorganosiloxane polymer (c2) is carried on the surface of the titanium oxide (b) and/or silica (c1), but also the polyorganosiloxane polymer (c2) is migrated, absorbed, doped or blended into the titanium oxide (b) and/or silica (c1). Namely, the carried portion is not limited. Of these, it is especially preferred that the polyorganosiloxane polymer (c2) is carried on the surface of titanium oxide (b) and/or silica (c1). In case where titanium oxide (b) and/or silica (c1) have been surface treated with a treating agent such as mentioned above, the polyorganosiloxane polymer (c2) is carried (absorbed, adsorbed or held) on the surface of the surface-treated titanium oxide (b) and/or silica (c1).

In the present invention, the products comprising a polyorganosiloxane polymer (c2) carried on the surface of silica (c1) are especially preferred. Such products are easily available as they have already been commercially sold as silicone powder by Toray Dow Corning Silicone Co., Ltd., etc. In the following description, silicone powder (c) alone is mentioned, but the same effect can be obtained when using a product comprising a polyorganosiloxane polymer (c2) carried on the surface of titanium oxide (b).

As for the mixing ratios of silica (c1) and polyorganosiloxane polymer (c2) in silicone powder (c), the ratio of silica (c1) is preferably selected from the range of 10 to 90% by weight and the ratio of polyorganosiloxane polymer (c2) from the range of 90 to 10% by weight. When the ratio of silica (c1) in silicone powder (c) is less than 10% by weight, it is difficult to carry the polyorganosiloxane polymer (c2) on silica (c1) and a desired dry powder may be hardly obtainable. On the other hand, when the silica ratio exceeds 90% by weight, the molded article tends to be impaired in appearance because of too low content of polyorganosiloxane polymer (c2). More preferably, silica (c1) is 20 to 80% by weight and the polyorganosiloxane polymer (c2) is 80 to 20% by weight.

Silicone powder (c) may be: (1) silicone powder in which a polyorganosiloxane polymer (c21) having no functional group is carried on the surface of silica (c1); (2) silicone powder in which a polyorganosiloxane powder (c22) having a methacrylic group or an epoxy group as functional group is carried on the surface of silica (c1); or (3) a mixture of (1) and (2).

In case where a polyorganosiloxane polymer (c2) is carried on silica (c1), it is possible to use an adhesion promoter. Use of an adhesion promoter assures even stronger interfacial adhesion between silica (c1) and polyorganosiloxane polymer (c2). An example of such adhesion promoters usable in this invention is alkoxysilane type adhesion promoters. As such alkoxysilane type adhesion promoters, the compounds having at least one $C_1$–$C_4$ alkoxyl group and at least one group selected from epoxy, acryloxy, methacryloxy, vinyl, phenyl and N-β-(N-vinylbenzylamino)ethyl-γ-aminoalkyl hydrochloride in the molecule can be exemplified.

As the alkoxysilane type adhesion promoter, preferably the compounds represented by the formula $QSi(OMe)_3$ (wherein Me represents a methyl group and Q represents a group selected from epoxyalkyl, acryloxyalkyl, methacryloxyalkyl, vinyl, phenyl and N-β-(N-vinylbezylamino) ethyl-γ-aminoalkyl monohydrogenhydrochloride) are used. Practical examples of such compounds include γ-acryloxypropyltrimethoxysilane, γ-methacryloxypropyltrimethoxysilane, γ-glycidoxypropylpropyltrimethoxysilane, N-β-(N-vinylbenzylamino)ethyl-γ-aminopropyltrimethoxysilane monohydrogenhydrochloride, phenyltrimethoxysilane, and vinyltrimethoxysilane.

The adhesion promoter is added in an amount of preferably 0.5 to 15 parts by weight based on 100 parts by weight of silica (c1). The time of its addition is preferably synchronized with mixing of a polyorganosiloxane polymer (c2) with silica (c1).

The content of silicone powder (c) to be blended is selected from the range of 0.1 to 10 parts by weight based on 100 parts by weight of the aromatic polycarbonate resin (a). When the amount of silicone powder (c) blended is less than 0.1 part by weight, the molded article of the produced resin composition tends to become unsatisfactory in flame retardancy, mechanical strength and heat resistance, and when its amount exceeds 10 parts by weight, the resin composition is liable to lack impact resistance and fluidity. The preferred amount of silicone powder (c) is 0.2 to 8 parts by weight, more preferably 0.5 to 5 parts by weight, based on 100 parts by weight of the aromatic polycarbonate resin (a).

Polytetrafluoroethylene (d) used in the present invention functions to prevent dripping in combustion. It is preferably of the type having the fibril forming properties, or the nature to become fibrillated on receiving a shear stress during kneading in the process of production of the resin composition or in the process of producing a molded article from the resin composition by injection molding. Addition of polytetrafluoroethylene (d) is conducive to affording of high flame retardancy to the resin composition. Polytetrafluoroethylene having the fibril forming properties is classified into 3 types under the ASTM standards. The following are some examples of the commercial products of polytetrafluoroethylene usable in the present invention: Teflon 6J and Teflon 30J (trade names, produced by Mitsui Du Pont Flourochemical Co., Ltd.); Polyflon MPA FA100, Polyflon F20C and Polyflon TFE F201 (trade names, produced by Daikin Chemical Industries Co., Ltd.); Argoflon F5 (trade name, produced by Montefluos Co., Ltd.).

The amount of polytetrafluoroethylene (d) to be blended is selected from the range of 0.01 to 5 parts by weight based on 100 parts by weight of the aromatic polycarbonate resin (a). When the amount of polytetrafluoroethylene (d) is less than 0.01 part by weight, the dripping preventive effect may be insufficient, and when the amount of (d) exceeds 5 parts by weight, the molded article may be adversely affected in its appearance. The more preferred amount of (d) is 0.02 to 4 parts by weight, especially 0.05 to 3 parts by weight.

The polycarbonate resin composition according to the present invention preferably contains a fluorescent brightener (e), an ultraviolet absorber (f) and an organosulfonic acid metal salt in addition to the said components. Fluorescent brightener (e) is a pigment or a dye which is incorporated in the molded article to make it look brighter. It functions to eliminate the yellowish tinge of the molded article and enhance its brightness. It resembles the bluing agent functionally in that it works to get rid of the yellowish tinge of the molded article, but they differ in that while the bluing agent simply absorbs yellowish light in the molded article, the fluorescent brightener (e) absorbs ultraviolet light, changes its energy into bluish purple light in the visible region and radiates it.

Fluorescent brightener (e) is a dye of various origins such as cumarin, naphthotriazolylstilbene, benzoxazole, benzimidazole and diaminostilbene disulfonate. The commercial products of such fluorescent brightener are easily available as they are sold, for example, under the trade names of HAKKOL PSR by Hakkol Chemical Co., Ltd., "Host a luxKCB" by Hoechst AG, and "White Flour PSN CONC" by Sumitomo Chemical Co., Ltd.

Fluorescent brightener (e) is preferably blended in an amount of 0.005 to 0.1 part by weight based on 100 parts by weight of the aromatic polycarbonate resin (a). When the content of fluorescent brightener (e) is less than 0.005 part by weight, the brightener may be unable to fully display its normal function to eliminate the yellowish tinge of the molded article and enhance its brightness. When its content exceeds 0.1 part by weight, it may be unable to keep coordination with other colorants. The particularly preferred range of content of fluorescent brightener (e) is 0.01 to 0.05 part by weight based on 100 parts by weight of the aromatic polycarbonate resin (a).

When the molded article is left exposed to sunlight or light from a fluorescent lamp for a long time, it comes to assume a yellowish tinge by the action of ultraviolet light. Ultraviolet absorber (f) functions to greatly prolong the time till the molded article comes to assume a yellowish tinge. It is possible to use various types of ultraviolet absorber such as benzophenone type, benzotriazole type, phenyl salicylate type, and hindered amine type.

Examples of benzophenone type ultraviolet absorbers include 2,4-dihydroxy-benzophenone, 2-hydroxy-4-methoxy-benzophenone, 2-hydroxy-4-n-octoxy-benzophenone, 2-hydroxy-4-dodesiloxy-benzophenone, 2-hydroxy-4-octadesiloxy-benzophenone, 2,2'-dihydroxy-4-methoxy-benzophenone, 2,2'-dihydroxy-4,4'-dimethoxy-benzophenone, and 2,2 ', 4,4'-tetrahydroxy-benzophenone. Examples of benzotriazole type ultraviolet absorbers include 2-(2H-benzotriazole-2-yl)-p-cresol, 2-(2H-benzotriazole-2-yl)-4,6-bis(1-methyl-1-phenylmethyl)phenol, 2-[5-chloro (2H)-benzotriazole-2-yl]-4-methyl-6-(tert-butyl)phenol, 2,4-ditert-butyl-6-(5-chlorobenzotriazole-2-yl)phenol, 2-(2H-benzotriazole-2-yl)-4,6-ditert-pentylphenol, 2-(2H-benzotriazole-2-yl)-4-(1,1,3,3-tetramethylbutyl)phenol, 2,21'-methylenebis[6-(2H-benzotriazole-2-yl)-4-(1,1,3,3-tetramethylbutyl)phenol].

Examples of phenyl salicylate type ultraviolet absorbers include phenyl salicylate and 2,4-ditert-butylphenyl-3,5-ditert-butyl-4-hydroxybenzoate. Examples of hindered amine type ultraviolet absorbers include bis(2,2,6,6-tetramethylpiperidine-4-yl) sebacate.

The ultraviolet absorbers (f) usable in the present invention include, besides the above-mentioned 4 types of compounds, the compounds having a function to convert the energy held by ultraviolet light into vibrational energy in the molecule and gives off such vibrational energy as heat energy. It is also possible to use those compounds which, when used in combination with an antioxidant or a colorant, produce a synergistic effect, and light stabilizers called "quenchers" which act as an energy converting agent.

The content of ultraviolet absorber (f) is selected to fall in the range of 0.01 to 2 parts by weight based on 100 parts by weight of the aromatic polycarbonate resin (a). When the content of (f) is less than 0.01 part by weight, the molded article of the obtained resin composition may be unsatisfactory in weather resistance, and when the content of (f) exceeds 2 parts by weight, the molded article becomes defective in color coordination because of too strong yellowish tinge and also tends to cause bleedout. The preferred content of ultraviolet absorber (f) is 0.05 to 1 part by weight, more preferably 0.1 to 1 part by weight based on 100 parts by weight of the aromatic polycarbonate resin (a).

Organosulfonic acid metal salt (g) serves to expedite the functions of the said fluorescent brightener (e) and ultraviolet absorber (f). As such organosulfonic acid metal salt (g), there can be used, for instance, perfluoroalkanesulfonic acid metal salts (g1) and aromatic sulfonesulfonic acid metal salts (g2). Organosulfonic acid metal salt (g) may be a mixture of two or more different types of metal salt. The metal salt of organosulfonic acid is preferably a salt of an alkali metal or an alkaline earth metal such as sodium, lithium, potassium, rubidium, cesium, beryllium, magnesium, calcium, strontium and barium.

Preferred examples of perfluoroalkanesulfonic acid metal salts (g1) are alkali metal salts of sulfonic acid having $C_1$–$C_8$ perfluoroalkane groups, and alkaline earth metal salts of sulfonic acid having $C_1$–$C_8$ perfluoroalkane groups. More specific examples of such sulfonic acids are perfluoromethanesulfonic acid, perfluoroethanesulfonic acid, perfluoropropanesulfonic acid, perfluorobutanesulfonic acid, perfluoropentanesulfonic acid, perfluorohexanesulfonic acid, and perfluorooctanesulfonic acid.

As aromatic sulfonic acid metal salt (g2), there can be used, for instance, aromatic sulfonesulfonic acid alkali metal salts and aromatic sulfonesulfonic acid alkaline earth metal salts. These metal salts may be polymers. Examples of aromatic sulfonesulfonic acid metal salts include sodium salt of diphenylsulfone-3-sulfonic acid, potassium salt of diphenylsulfone-3-sulfonic acid, sodium salt of 4,'-dibromodiphenylsulfone-3-sulfonic acid, potassium salt of 4,4'-dibromodiphenylsulfone-3-sulfonic acid, potassium salt of 4-chloro-4'-nitrodiphenylsulfone-3-sulfonic acid, disodium salt of diphenylsulfone-3,3'-disulfonic acid, and dipotassium salt of diphenylsulfone-3,3'-disulfonic acid.

The content of organosulfonic acid metal salt (g) is preferably selected from the range of 0.001 to 5 parts by weight based on 100 parts by weight of the aromatic polycarbonate resin (a). When the content of (g) exceeds 5 parts by weight, the produced resin composition proves low in heat stability. The more preferred content of (g) is 0.005 to 3 parts by weight, especially 0.01 to 1 part by weight, based on 100 parts by weight of the aromatic polycarbonate resin (a).

In the polycarbonate resin composition according to the present invention, a thermoplastic resin (h) other than the aromatic polycarbonate resins may be blended as desired. Examples of such thermoplastic resins (h) are polyester resins such as polyethylene terephthalate and polybutylene terephthalate, polyamide resins, styrene resins such as HIPS resins and ABS resins, and olefin resins such as polyethylene and polypropylene. The content of thermoplastic resin (h) other than the aromatic polycarbonate resins is preferably not more than 40% by weight, more preferably not more than 30% by weight of the combined amount of aromatic polycarbonate resin (a) and thermoplastic resin (h) other than the aromatic polycarbonate resins.

The polycarbonate resin composition according to the present invention may contain where necessary various types of resin additives, for example, impact improver, stabilizer such as antioxidant, pigment other than titanium oxide, dye, flame-retardant other than those mentioned above, release agent, sliding improver, anticorrosive, reinforcing materials such as glass fiber and glass flakes, and whiskers of potassium titanate, aluminum borate, etc.

The method of producing the polycarbonate resin composition according to the present invention is not specifically defined; for example, the following methods can be used: (1) An aromatic carbonate resin (a), titanium oxide (b), silicone powder (c), polytetrafluoroethylene (d), and if necessary a fluorescent brightener (e), an ultraviolet absorber (f) and an organosulfonic acid metal salt (g) are mixed, melted and kneaded all together; (2) Titanium oxide (b) and silicone powder (c) are previously mixed with an aromatic polycarbonate resin (a), and after kneading the mixture, polytetrafluoroethylene (d) and if necessary a fluorescent brightener (e), an ultraviolet absorber (f) and an organosulfonic acid metal salt (g) are further mixed, melted and kneaded; (3) An aromatic polycarbonate resin (a) and titanium oxide (b) are first mixed and kneaded, and then silicone powder (c), polytetrafluoroethylene (d) and if necessary a fluorescent brightener (e), an ultraviolet absorber (f) and an organosulfonic acid metal salt (g) are further mixed, melted and kneaded.

For mixing the components and melting and kneading the mixture, it is possible to use the conventional methods applied to the ordinary resin compositions by using a suitable mixing means such as ribbon blender, Henschel mixer, Banbury mixer, drum tumbler, single-or double-screw extruder, etc., and a kneader. The melting and kneading temperature is not specified, but it is usually selected from the range of 240 to 340° C.

The molded articles obtained from the polycarbonate resin composition according to the present invention show a light reflectance of not less than 90% at a wavelength of 700 mm when the molded articles are 2 mm thick. Further, when the molded articles are 3 mm thick, their overall light transmittance is not more than 0.3%, which indicates excellent light screening effect of these molded articles.

The polycarbonate resin composition according to the present invention can be used as molding material for a variety of molded articles. As the molding method, all the conventional methods used for molding thermoplastic resins, such as injection molding, extrusion molding, blow molding, rotational molding, compression molding, differential pressure molding and transfer molding, can be applied directly.

Since the molded articles according to the present invention are flame retardant and also excel in light reflectance and light screening properties, they are very useful as industrial products in many fields, such as, for instance, light reflectors for backlight of liquid crystal displays, light reflectors for lightening apparatus, automobile meter panels, and various types of switches such as luminous push switches and photoelectric switches.

The present invention, as described above in detail, provides the following remarkable advantageous effects and its industrial utility value is very great.

1. The polycarbonate resin composition according to the present invention is very useful as a material for producing molded articles having excellent flame retardancy, impact strength, heat resistance, light reflectance, etc.
2. Containing no halogen type or phosphate type compounds, the polycarbonate resin composition according to the present invention is free of such problems as corrosive action on the screws, cylinder and mold of the molding machine, burning of the resin and low heat resistance.
3. Having excellent flame retardancy, impact strength, heat resistance, light reflectance and light screening properties, the molded articles produced from the polycarbonate resin composition according to the present invention are very useful for the electric and electronic devices using liquid crystal backlight systems, illuminators for advertising towers and such, automobile parts such as meter panel, etc.

EXAMPLES

The present invention is described in further detail with reference to the examples thereof, which examples however are merely intended to be illustrative and not to be construed as limiting the scope of the invention in any way.

The abbreviations or symbolic names and the properties of the composition materials used in the Examples and the Comparative Examples are as explained below.

(1) Aromatic PC: poly-4,4-isopropylidenediphenyl carbonate having a viscosity-average molecular weight of 21,000.
(2) Titanium oxide: titanium oxide surface-treated with methylhydrogenopolysiloxane (trade name TIPAQUE PC-3, produced by Ishihara Sangyo KK)
(3) Silicone powder 1: 60 wt % of linear polydimethylsiloxane having a viscosity of 60,000 cSt was carried on 40 wt % of silica and powdered (trade name Trefil F202, produced by Toray Dow Corning Silicone Co., Ltd.)
(4) Silicone powder 2: 60 wt % of polydimethylsiloxane having a methacrylic group was carried on 40 wt % of silica and powdered (trade name DC 4-7081 produced by Dow Corning Co., Ltd.).
(5) Silicone powder 3: 60 wt % of polydimethylsiloxane having an epoxy group was carried on 40 wt % of silica and powdered (trade name DC 4-7051, produced by Dow Corning Co., Ltd.)
(6) Silicone oil: linear polydimethylsiloxane having a viscosity of 60,000 cSt (trade name SH-200, produced by Toray Dow Corning Silicone Co., Ltd.)
(7) PTFE: polytetrafluoroethylene (trade name Polyflon F-201L, produced by Daikin Industries Co., Ltd.)
(8) Fluorescent brightener: 3-phenyl-(2H-naphtho(1,2-d)-triazole-2-il)cumarin (trade name HAKKOL PSR produced by Hakkol Chemical Co., Ltd.)
(9) Ultraviolet absorber: 2-(2H-benzotriazole-2-yl)-4-(1,1,3,3-tetramethylbutyl)phenol.
(10) organosulfonic acid metal salt: potassium salt of perfluorobutanesulfonic acid.

Property evaluations of the test pieces were made by the following methods.

(a) Flammability Test

Vertical flame test was conducted on the 1.6 mm thick test pieces of UL standards to evaluate their flammability. The test pieces which have passed the level V-O in the flame test were marked V-O, and those which have failed to pass the level V-O were indicated by NG.

(b) Izod Impact Strength (J/m)

3.2 mm thick Izod impact test pieces were injection molded, and each of these test pieces was given a notch of 0.25R and subjected to the evaluation test according to JIS K7110 (1999).

(c) Deflection Temperature Under Load (° C.)

Injection molded 6.4 mm thick and 12.7 mm wide test pieces were subjected to the test according to JIS K6911 (1995) under a load of 1.82 MPa.

(d) Light Reflectance (%)

Light rays with wavelengths of 700 nm and 400 nm were applied to the injection molded 2 mm thick square flat plates and reflectance was determined according to JIS K7105 (1981).

(e) Light Transmittance (%)

Using the 3 mm thick square flat plates prepared for the determination of light reflectance of (d), their light transmittance was determined according to JIS K7361 (1997).

(f) Appearance

Molded article appearance was evaluated by visual observation of the 3 mm thick square flat plates prepared for the determination of light reflectance of (d). The test pieces which showed no sign of burning of the resin and had good visual appearance were marked with Åo, and those which suffered burning of the resin and had bad appearance were marked with x.

Examples 1–15 and Comparative Examples 1–7

The composition materials were weighed out at the rates shown in Tables 1 to 5, mixed by a tumbler for 20 minutes, then melted and kneaded by an 30 mmϕ double-screw extruder (Model TEX30HSST mfd. by Japan Steel Works, Ltd.) at a cylinder temperature of 270° C. and pelletized. The obtained pellets were molded into the test pieces for the flame test by an injection molding machine (Model J50E, mfd. by Japan Steel Works, Ltd.) at a cylinder temperature of 290° C., and their flammability was evaluated. There were also prepared the test pieces for the various tests by the same injection molding machine at a cylinder temperature of 280° C., and these test pieces were subjected to the various evaluation tests. The results are shown in Tables 1 to 5.

TABLE 1

|  | Example | | | | |
| --- | --- | --- | --- | --- | --- |
|  | 1 | 2 | 3 | 4 | 5 |
| Composition materials (parts by weight) | | | | | |
| Aromatic PC | 100 | 100 | 100 | 100 | 100 |
| Titanium oxide | 14 | 14 | 14 | 14 | 14 |
| Silica | — | — | — | — | — |
| Silicone powder 1 | 1.2 | 2.4 | — | 1.2 | 1.2 |
| Silicone powder 2 | — | — | 2.4 | 1.2 | — |
| Silicone powder 3 | — | — | — | — | 1.2 |
| Silicone oil | — | — | — | — | — |
| PTFE | 0.35 | 0.35 | 0.35 | 0.35 | 0.35 |
| Fluorescent brightener | — | — | — | — | — |
| Ultraviolet absorber | — | — | — | — | — |
| Organosulfonic acid metal salt | — | — | — | — | — |
| Properties evaluation tests | | | | | |
| Flammability test | V-0 | V-0 | V-0 | V-0 | V-0 |
| Izod impact strength (J/m) | 530 | 510 | 510 | 510 | 510 |
| Deflection temperature under load (° C.) | 130 | 130 | 130 | 130 | 130 |
| Light reflectance (%) | | | | | |
| At wavelength of 700 nm | 93 | 95 | 95 | 95 | 95 |
| At wavelength of 400 nm | 42 | 42 | 42 | 42 | 42 |

TABLE 1-continued

| | Example | | | | |
|---|---|---|---|---|---|
| | 1 | 2 | 3 | 4 | 5 |
| Light transmittance (%) | 0.1 | 0.1 | 0.1 | 0.1 | 0.1 |
| Appearance | Åo | Åo | Åo | Åo | Åo |

TABLE 2

| | Example | | | | |
|---|---|---|---|---|---|
| | 6 | 7 | 8 | 9 | 10 |
| Composition materials (parts by weight) | | | | | |
| Aromatic PC | 100 | 100 | 100 | 100 | 100 |
| Titanium oxide | 14 | 14 | 14 | 14 | 14 |
| Silica | — | — | — | — | — |
| Silicone powder 1 | — | 2.4 | 1.2 | 1.2 | 1.2 |
| Silicone powder 2 | 1.2 | — | — | — | — |
| Silicone powder 3 | 1.2 | — | — | — | — |
| Silicone oil | — | — | — | — | — |
| PTFE | 0.35 | 0.35 | 0.35 | 0.35 | 0.35 |
| Fluorescent brightener | — | — | 0.03 | 0.03 | 0.03 |
| Ultraviolet absorber | — | — | — | — | 0.35 |
| Organosulfonic acid metal salt | — | 0.08 | — | — | — |
| Properties evaluation tests | | | | | |
| Flammability test | V-0 | V-0 | V-0 | V-0 | V-0 |
| Izod impact strength (J/m) | 510 | 500 | 530 | 530 | 520 |
| Deflection temperature under load (° C.) | 130 | 129 | 129 | 129 | 129 |
| Light reflectance (%) | | | | | |
| At wavelength of 700 nm | 95 | 95 | 95 | 95 | 95 |
| At wavelength of 400 nm | 42 | 42 | 57 | 57 | 50 |
| Light transmittance (%) | 0.1 | 0.1 | 0.1 | 0.1 | 0.1 |
| Appearance | Åo | Åo | Åo | Åo | Åo |

TABLE 3

| | Example | | | | |
|---|---|---|---|---|---|
| | 11 | 12 | 13 | 14 | 15 |
| Composition materials (parts by weight) | | | | | |
| Aromatic PC | 100 | 100 | 100 | 100 | 100 |
| Titanium oxide | 14 | 14 | 14 | 14 | 14 |
| Silica | — | — | — | — | 0.9 |
| Silicone powder 1 | 2.4 | — | 1.2 | 1.2 | — |
| Silicone powder 2 | — | 2.4 | 1.2 | 1.2 | — |
| Silicone powder 3 | — | — | — | — | — |
| Silicone oil | — | — | — | — | 1.5 |
| PTFE | 0.35 | 0.35 | 0.35 | 0.35 | 0.35 |
| Fluorescent brightener | 0.03 | 0.03 | 0.03 | 0.03 | — |
| Ultraviolet absorber | 0.35 | 0.35 | 0.35 | 0.35 | — |
| Organosulfonic acid metal salt | — | — | — | 0.08 | — |
| Properties evaluation tests | | | | | |
| Flammability test | V-0 | V-0 | V-0 | V-0 | V-0 |
| Izod impact strength (J/m) | 510 | 510 | 510 | 500 | 520 |
| Deflection temperature under load (° C.) | 129 | 129 | 129 | 128 | 130 |

TABLE 3-continued

| | Example | | | | |
|---|---|---|---|---|---|
| | 11 | 12 | 13 | 14 | 15 |
| Light reflectance (%) | | | | | |
| At wavelength of 700 nm | 95 | 95 | 95 | 95 | 94 |
| At wavelength of 400 nm | 50 | 50 | 50 | 50 | 42 |
| Light transmittance (%) | 0.1 | 0.1 | 0.1 | 0.1 | 0.1 |
| Appearance | Åo | Åo | Åo | Åo | Åo |

TABLE 4

| | Comparative Example | | | | |
|---|---|---|---|---|---|
| | 1 | 2 | 3 | 4 | 5 |
| Composition materials (parts by weight) | | | | | |
| Aromatic PC | 100 | 100 | 100 | 100 | 100 |
| Titanium oxide | 14 | 14 | 14 | 14 | 14 |
| Silica | — | — | — | — | — |
| Silicone powder 1 | — | — | 1.2 | — | 1.2 |
| Silicone powder 2 | — | — | — | 2.4 | 1.2 |
| Silicone powder 3 | — | — | — | — | — |
| Silicone oil | 0.7 | 1.5 | — | — | — |
| PTFE | 0.35 | 0.35 | — | — | — |
| Fluorescent brightener | — | — | — | — | — |
| Ultraviolet absorber | — | — | — | — | — |
| Organosulfonic acid metal salt | — | — | — | — | — |
| Properties evaluation tests | | | | | |
| Flammability test | NG | NG | NG | NG | NG |
| Izod impact strength (J/m) | 490 | 470 | 600 | 570 | 570 |
| Deflection temperature under load (° C.) | 128 | 127 | 130 | 129 | 129 |
| Light reflectance (%) | | | | | |
| At wavelength of 700 nm | 93 | 95 | 94 | 94 | 94 |
| At wavelength of 400 nm | 41 | 41 | 40 | 40 | 40 |
| Light transmittance (%) | 0.1 | 0.1 | 0.1 | 0.1 | 0.1 |
| Appearance | Åo | Åo | Åo | Åo | Åo |

TABLE 5

| | Comparative Example | |
|---|---|---|
| | 6 | 7 |
| Composition materials (parts by weight) | | |
| Aromatic PC | 100 | 100 |
| Titanium oxide | 14 | 14 |
| Silica | — | 0.9 |
| Silicone powder 1 | 2.4 | — |
| Silicone powder 2 | — | — |
| Silicone powder 3 | — | — |
| Silicone oil | — | — |
| PTFE | — | 0.35 |
| Fluorescent brightener | — | — |
| Ultraviolet absorber | — | — |
| Organosulfonic acid metal salt | 0.08 | — |
| Properties evaluation tests | | |
| Flammability test | NG | NG |
| Izod impact strength (J/m) | 570 | 530 |

TABLE 5-continued

|  | Comparative Example | |
| --- | --- | --- |
|  | 6 | 7 |
| Deflection temperature under load (° C.) | 129 | 130 |
| Light reflectance (%) | | |
| At wavelength of 700 nm | 94 | 95 |
| At wavelength of 400 nm | 40 | 42 |
| Light transmittance (%) | 0.1 | 0.1 |
| Appearance | Å o | Å o |

The following facts are apparent from Tables 1 to 5.

(1) The polycarbonate resin compositions according to the Examples of the present invention excel in flame retardancy (even the thin-gage test pieces of these compositions passing the level of V-0 in the flame test) and in impact resistance. Also, the 2 mm thick molded articles of these compositions show a light reflectance of not less than 90% at a wavelength of 700 nm, and the 3 mm thick molded articles show a light transmittance of not greater than 0.3%, indicating their excellent light screening properties. Further, these molded articles have good appearance.

(2) The polycarbonate resin compositions of Comparative Examples 1 and 2, which contains no silicone powder (c) (that is, contains no silica) although containing silicone oil (namely, polyorganosiloxane polymer), are poor in impact resistance and fail to pass the level V-0 in the flame test, indicating low flame retardancy.

(3) The polycarbonate resin compositions of Comparative Examples 1 and 2 are substantially equal to those of Examples 1, 3, 4 and 7 in light reflectance and light screening properties as they contain surface-treated titanium oxide (b), but these compositions, which contain no PTFE, are unable to prevent dripping and can not pass the level V-0 in the flame test, i.e. poor in flame retardancy. In the case of Comparative Example 7, the composition fails to pass the level V-0 in the flame test as it contains no silicone oil (namely, polyorganosiloxane polymer) although containing silica.

What is claimed is:

1. A polycarbonate resin composition comprising 100 parts by weight of an aromatic polycarbonate resin (a), 3 to 30 parts by weight of titanium oxide (b), 0.01 to 9 parts by weight of silicone powder (c) comprising 0.01 to 9 parts by weight of silica (c1) and 0.01 to 9 parts by weight of a polyorganosiloxane polymer (c2) carried on the silica (c1), and 0.01 to 5 parts by weight of polytetrafluoroethylene (d).

2. A polycarbonate resin composition according to claim 1, showing a light reflectance of not less than 90% at 700 nm in its 2 mm thick molded articles and showing an overall light transmittance of not more than 0.3% in its 3 mm thick molded articles.

3. Molded articles comprising the polycarbonate resin composition as defined in claim 1.

4. A resin composition according to claim 1, wherein the ratio of the silicone powder (c) is 0.1 to 10 parts by weight based on 100 parts by weight of the aromatic polycarbonate resin (a).

5. A resin composition according to claim 1, wherein titanium oxide (b) is surface-treated with a siloxane type surface treating agent.

6. A polycarbonate resin composition according to claim 1, wherein the silica (c1) and the polyorganosiloxane polymer (c2) are present as a silicone powder (c) comprising a polyorganosiloxane polymer (c21) having no functional group and carried on the silica (c1); comprising a polyorganosiloxane polymer (c22) having a functional group and carried on the silica (c1) or a mixture thereof.

7. A polycarbonate resin composition according to claim 6, wherein the polyorganosiloxane polymer (c22) having a functional group is one having a methacrylic group or one having an epoxy group.

8. A polycarbonate resin composition according to claim 1, wherein the polyorganosiloxane polymer (c2) is a polydimethylsiloxane polymer.

9. A polycarbonate resin composition according to claim 3, wherein the silicone powder (c) comprises 10 to 90% by weight of silica (c1) and 90 to 10% by weight of a polyorganosiloxane polymer (c2).

10. A polycarbonate resin composition according to claim 1, further comprising a fluorescent brightener (e) in an amount of 0.005 to 0.1 part by weight based on 100 parts by weight of the aromatic polycarbonate resin (a).

11. A polycarbonate resin composition according to claim 1, further comprising an ultraviolet absorber (f) in an amount of 0.01 to 2 parts by weight based on 100 parts by weight of the aromatic polycarbonate resin (a).

12. A polycarbonate resin composition according to claim 1, further comprising an organosulfonic acid metal salt (g) in an amount of 0.001 to 5 parts by weight based on 100 parts by weight of the aromatic polycarbonate resin (a).

13. A polycarbonate resin composition according to claim 12, wherein the organosulfonic acid metal salt is a metal salt of perfluoroalkanesulfonic acid.

14. A polycarbonate resin composition according to claim 1, wherein the viscosity-average molecular weight of the aromatic polycarbonate resin (a) is within the range of 16,000 to 30,000.

* * * * *